United States Patent [19]

Wolff

[11] Patent Number: 5,048,349
[45] Date of Patent: Sep. 17, 1991

[54] CORIOLIS-TYPE MASS FLOW METER COMPRISING AT LEAST TWO STRAIGHT PARALLEL VIBRATING TUBES

[75] Inventor: Christianus J. M. Wolff, Rijswijk, Netherlands

[73] Assignee: Shell Oil Company, Houston, Tex.

[21] Appl. No.: 58,667

[22] Filed: May 21, 1987

Related U.S. Application Data

[63] Continuation of Ser. No. 815,653, Dec. 27, 1985, abandoned, which is a continuation of Ser. No. 577,633, Feb. 6, 1984, abandoned.

[30] Foreign Application Priority Data

Feb. 21, 1983 [GB] United Kingdom ............... 8304783

[51] Int. Cl.⁵ ............................................. G01F 1/84
[52] U.S. Cl. .................................................. 73/861.37
[58] Field of Search ............... 73/861.37, 861.38, 32 A

[56] References Cited

U.S. PATENT DOCUMENTS

| | | | |
|---|---|---|---|
| 2,635,462 | 4/1953 | Poole et al. | 73/32 |
| 2,821,084 | 1/1958 | Altfillisch et al. | 73/861.38 |
| 3,080,750 | 3/1963 | Wiley et al. | 73/861.37 |
| 3,218,851 | 11/1965 | Sipin . | |
| 3,276,257 | 10/1966 | Roth . | |
| 3,329,019 | 7/1967 | Sipin | 73/861.37 |
| 3,355,944 | 12/1964 | Sipin . | |
| 3,396,579 | 8/1968 | Souriau | 73/861.38 |
| 3,444,723 | 5/1969 | Warefield | 73/32 |
| 3,456,491 | 7/1969 | Brockhaus | 73/32 |
| 3,485,098 | 12/1969 | Sipin . | |
| 4,109,524 | 8/1978 | Smith . | |
| 4,127,028 | 11/1978 | Cox et al. . | |
| 4,187,721 | 2/1980 | Smith . | |
| 4,252,028 | 2/1981 | Smith et al. | 73/861.38 |
| 4,311,054 | 1/1982 | Cox | 73/861.38 |
| 4,442,389 | 5/1984 | Potzick et al. | 73/861.27 |
| 4,491,025 | 1/1985 | Smith et al. | 73/861.38 |
| 4,616,509 | 10/1986 | Feller | 73/861.05 |
| 4,622,858 | 11/1986 | Mizerak | 73/861.38 |

*Primary Examiner*—Herbert Goldstein

[57] ABSTRACT

A coriolis-type mass flow meter is provided for use directly in a flow line. The meter has at least two straight flow tubes that have fluid flowing therethrough mounted with parallel axes. The flow tubes are vibrated in a direction normal to the flow direction and their axis by an exciting means at about 50% of their length. Detector means are spaced equidistantly from the exciting means (about 25% and 75% of the flow tube length) to detect the difference in phase between the upstream and the downstream portions of the flow tube relative to the exciting means. The phase difference between the two detectors is proportional to the mass flow rate through the flow tubes.

2 Claims, 2 Drawing Sheets

CORIOLIS-TYPE MASS FLOW METER COMPRISING AT LEAST TWO STRAIGHT PARALLEL VIBRATING TUBES

This is a continuation of application Ser. No. 815,653, filed Dec. 27, 1985, now abandoned, which is a continuation of application Ser. No. 577,633, filed Feb. 6, 1984, now abandoned.

BACKGROUND OF THE INVENTION

The invention relates to a Coriolis-type mass flow meter and, in particular, to such a meter comprising at least two straight parallel vibrating tubes.

These meters can be used, in particular, for the monitoring of multi-phase flows in flow lines. Coriolis-type mass flow meters comprising one straight vibrating tube are already known. These meters are based upon the following principle: The flow to be measured flows through a straight tube which is part of a flow line. The ends of the tube are clamped. The tube itself is adapted to be excited at 50 percent of its length and vibrates at or near its resonance frequency. A mass flow through the tube causes distortion of this forced vibration and a phase difference to occur between the upstream and downstream part of the tube, which is proportional to mass flow. The theoretical relations between mass flow rate and phase difference are known to those skilled in the art and will not be explained in detail. The length of the meter is a critical parameter: the meter sensitivity increases proportionally to the total tube length and in multi-phase flow a minimum length-to-inner diameter ratio is required.

However, for practical applications the length of the meter should be limited and therefore the diameter of the vibrating tube must be reduced with respect to the flow line diameter. For one straight vibrating tube, this results in too high a pressure loss in the meter, which may cause serious measuring problems.

It is therefore an object of the invention to provide a Coriolis-type mass flow meter of restricted length, which is suitable to be used for monitoring multi-phase flow and can be handled easily.

SUMMARY OF THE INVENTION

The invention therefore provides a Coriolis-type mass flow meter to be used in a flow line, said meter comprising at least two straight parallel flow tubes for having a fluid flow therethrough, said flow tubes being adapted to be vibrated by an exciting means at 50 percent of the length of the flow tubes in a direction normal to the flow direction, and means adapted to detect the phase difference occurring between upstream and downstream parts of the flow tubes, at equal distances from the exciting means, when subjected to vibration at a certain frequency, and means adapted to connect the flow tubes to the flow line.

DESCRIPTION OF THE PREFERRED EMBODIMENT

Figure 1:
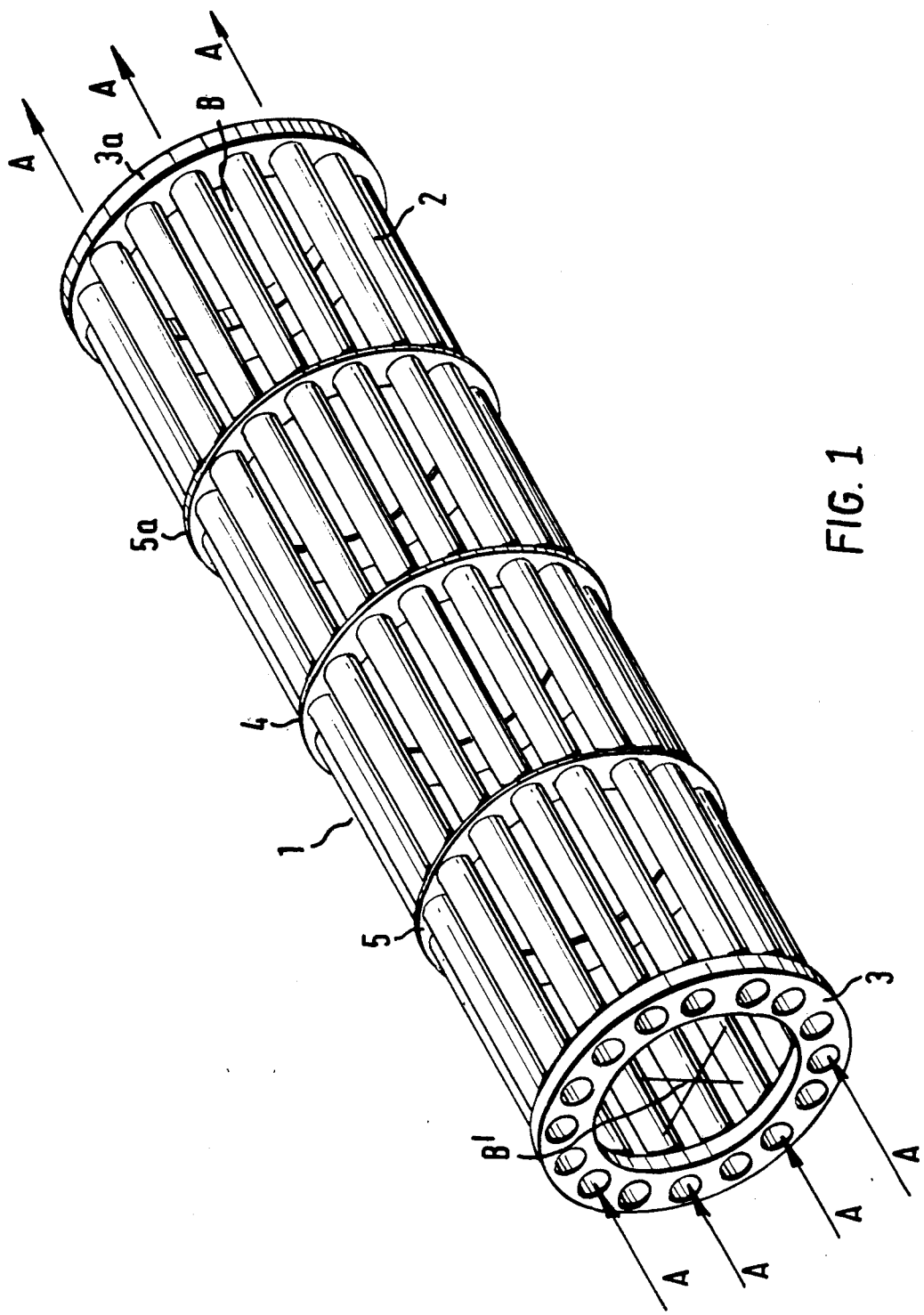
FIG. 1 represents a schematic three dimensional view of an embodiment of the invention.
Figure 2:
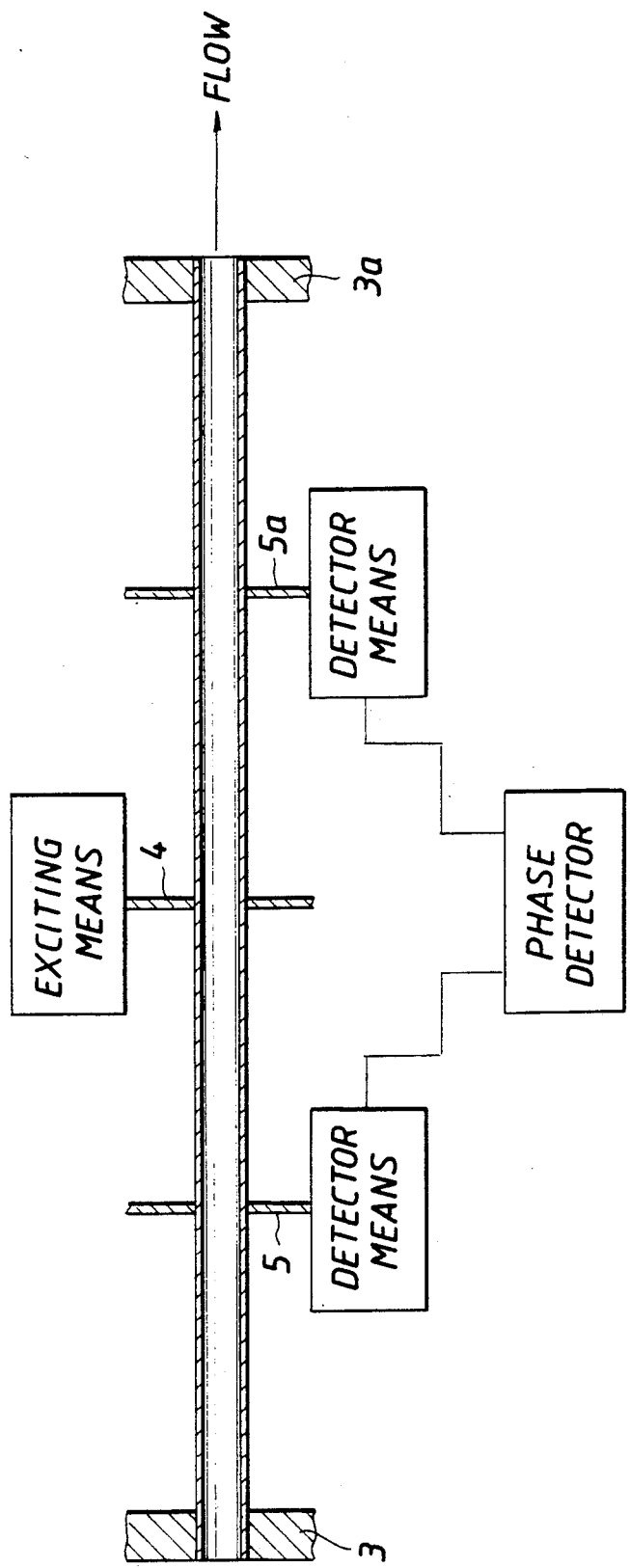
FIG. 2 is a simplified block diagram of the exciting and detecting arrangement for one representative flow tube.

With reference to the drawings, FIG. 1 shows a system 1 of a bundle of 16 parallel straight tubes 2 and a simplified illustration of the exciting and detecting arrangement for one of these flow tubes is shown in FIG. 2.

The system 1 is provided with flanges 3, 3a at its ends. In this way the system is adapted to be mounted into a flow line (not shown) for example, with flanges 3 and 3a clamped or fixed within a substantially rigid cylindrical flow line.

The system is further provided with exciting means adapted to vibrate the system of tubes at 50 percent of their lengths. The exciting means are not represented for the sake of clarity, but are arranged to impart transverse or normal vibration to the tubes.

The system is further provided with distortion detecting means (not represented for the sake of clarity). These means are provided at detecting points 5 and 5a at 25 percent and 75 percent of the tube lengths respectively In this embodiment the tubes have lengths of 0.9 meter; each tube has an inner diameter of 20 mm and a wall thickness of 0.5 mm.

Since, in the figure, the tubes 2 are fixed together at the exciting point 4 and detecting points 5, 5a respectively, they can be considered as one single tube. The operation of the system is as follows: The system or bundle of tubes is mounted in the flow line in any way suitable for the purpose. The space B—B¹ between the tubes 2 is closed by any means suitable for the purpose (not shown for reasons of clarity). A fluid is flowing through all separate parallel tubes 2 of the system 1 by any means suitable for the purpose, for example, a pump (not shown). The mounting of the system in the flow line is carried out in such a way, that the mounted system has clamped ends (not shown).

The system is excited at 50 percent of its length to give it a vibration in a direction normal to the flow direction. The flow direction is represented by the arrows A. Only a few arrows A have been represented for reasons of clarity. When the fluid flows through the tube-system 1, the fluid particles are forced to follow the transversal vibration of the tube walls.

In the first half of the tube, i.e., the upstream part, the amplitude of the normal or transversal vibration of each fluid particle will increase, whereas in the second half (i.e. the downstream part) of the tube it will decrease. The interaction between fluid and tube wall yields a force acting on the tube wall, which is known as the "Coriolic force". The term "Coriolic force" is known to those skilled in the art and will not be explained in further detail. In the first half of the tube the Coriolis force tends to slow down the vibration of the tube, since energy has to be stored in the vibration of the fluid, but in the second half of the tube the Coriolic force tends to stimulate the vibration: the energy is released again from the fluid.

The result is that the flow of a fluid through the tubes yields a S-shaped distortion of the tubes, the amplitude of which is proportional to the mass flow rate. Since the distortion occurs in a system vibrating at a certain frequency, the phase of the oscillation of the various points of the tubes is no longer equal. The upstream part of the tubes has a phase lag, whereas the downstream part leads in in phase. This consequence of the distortion allows the distortion to be measured in a simple way: the oscillating motions of the upstream and downstream parts of the tubes are detected by mounting suitable detectors, for example accelerometers, on the tubes, at about 25 percent and 75 percent of the tube lengths respectively. The phase difference or time lag between these two (sinusoidal) signals is now proportional to the mass flow through the tube. A variety of methods for measuring this phase difference is known to those skilled in the art and will not be described in detail.

It will be appreciated that the system of tubes may comprise any number of parallel-straight tubes suitable for the purpose, provided that this number is at least two. In advantageous embodiments of the invention the number of tubes is 3-24.

It will further be appreciated that tubes of any length and diameter suitable for the purpose can be used. In an advantageous embodiment of the invention the length-to-inner diameter ratio is larger than 50. The advantage of the use of tubes having a large length-to-inner diameter ratio is the increases sensitivity of the apparatus.

It will also be appreciated that several ways of arranging the tubes of the system and modes of vibrating the tubes are possible: for example, a bundle of tubes or a horizontal row of tubes, which are vibrated in a vertical direction or a system of tubes arranged in a circle with rotational vibration.

In case of two parallel tubes, the tubes may be vibrating in antiphase. The advantage of the above two ways of vibration is the balance of motion. In the above mentioned embodiments each individual tube always performs a linear vibration. However, it will be appreciated that a circular translation of the tube or bundle of tubes may be carried out, for example, by combining two linear vibrations—one moving horizontally, the other vertically, and 90° out of phase. The latter mode of vibration may be advantageous in multiphase flow, if the residence time of the individual fluid particles in the tube might not cover a sufficiently large number of periods of the vibration to ensure proper measurement.

It will be appreciated that the tubes may consist of any material suitable for the purpose.

It will further be appreciated that any suitable exciting means and any suitable detecting means may be used.

Further, the tubes need not be necessarily fixed at the exciting and detecting points. Various modifications of the invention will become apparent to those skilled in the art from the foregoing description and accompanying drawing, and are intended to fall within the scope of the appended claims.

What is claimed is:

1. Coriolis-type mass flow meter to be used in a flow line, comprising:
   at least two straight flow tubes for having a fluid flow therethrough having their longitudinal axes aligned in a parallel arrangement and having their extreme ends rigidly disposed,
   an exciting means disposed adjacent said tubes at about 50 percent of the length of said flow tubes for vibrating said tubes in a direction normal to the flow direction,
   means adapted to detect the phase difference occurring between upstream and downstream portions of the flow tubes when said flow tubes are subjected to vibration by said exciting means and located at equal distances from said exciting means, and
   means adapted to connect the flow tubes to said flow line, wherein said flow tubes comprise a circular arrangement of said tubes, and wherein the vibration is rotational.

2. Coriolis-type mass flow meter to be used in a flow line, comprising:
   sixteen straight flow tubes for having a fluid flow therethrough having their longitudinal axes aligned in a parallel arrangement and having their extreme ends rigidly disposed,
   an exciting disposed adjacent said tubes at about 50 percent of the length of said flow tubes for vibrating said tubes in a direction normal to the flow direction,
   means adapted to detect the phase difference occurring between upstream and downstream portions of the flow tubes when said flow tubes are subjected to vibration by said exciting means and located at equal distances from said exciting means, and
   means adapted to connect the flow tubes to said flow line.

* * * * *